United States Patent [19]

Supra

[11] Patent Number: 4,939,806
[45] Date of Patent: Jul. 10, 1990

[54] POOL CLEANER

[75] Inventor: Carl F. W. Supra, Johannesburg North, South Africa

[73] Assignee: Liberty Pool Products S.A., Geneva, Switzerland

[21] Appl. No.: 317,845

[22] Filed: Mar. 2, 1989

Related U.S. Application Data

[63] Continuation-in-part of Ser. No. 153,201, Feb. 8, 1988, Pat. No. 4,849,024, and a continuation-in-part of Ser. No. 307,048, Feb. 7, 1989.

[30] Foreign Application Priority Data

| Jan. 7, 1988 | [ZA] | South Africa | 88/0083 |
| Jan. 14, 1988 | [ZA] | South Africa | 88/0237 |
| Jan. 19, 1988 | [ZA] | South Africa | 88/0327 |
| Apr. 13, 1988 | [ZA] | South Africa | 88/2571 |
| Apr. 13, 1988 | [ZA] | South Africa | 88/2572 |

[51] Int. Cl.$^5$ .............................................. E04H 3/20
[52] U.S. Cl. .......................................... 15/1.7; 16/24; 134/21; 440/5
[58] Field of Search ............... 15/1.7; 440/5; 210/169; 134/21; 16/24

[56] References Cited

U.S. PATENT DOCUMENTS

| 3,229,315 | 12/1963 | Watson . | |
| 3,790,979 | 2/1974 | Foster . | |
| 3,822,754 | 7/1974 | Henkin et al. . | |
| 4,401,576 | 8/1983 | Meurer . | |
| 4,521,933 | 6/1985 | Raubenheimer | 15/1.7 |
| 4,789,364 | 12/1988 | Chauvier | 15/1.7 X |
| 4,790,344 | 12/1988 | Chauvier et al. | 15/1.7 X |

FOREIGN PATENT DOCUMENTS

2529183  1/1976  Fed. Rep. of Germany .
1203836  9/1970  United Kingdom .

*Primary Examiner*—Edward L. Roberts
*Attorney, Agent, or Firm*—Jones, Tullar & Cooper

[57] ABSTRACT

A swimming pool cleaner which has a head mounted on wheels, a suction passage through the head, a turbine which is mounted in the suction passage, and a propellor which is driven by the turbine and which propels the head. A rudder, which is oscillated via a gear train driven by the turbine, is used to vary the direction of movement of the head.

8 Claims, 3 Drawing Sheets

POOL CLEANER

CROSS-REFERENCE TO RELATED APPLICATIONS

The present application is a continuation-in-part of prior U.S. application Ser. No. 07/153,201, now U.S. Pat. No. 4,849,024 entitled Pool Cleaner, and filed on Feb. 8, 1988; and is also a continuation-in-part of prior U.S. application Ser. No. 07/307,048, entitled Movable Support and filed on Feb. 7, 1989.

BACKGROUND OF THE INVENTION

This invention relates to a device for cleaning a surface submerged in a liquid and to a method of cleaning such a surface.

SUMMARY OF THE INVENTION

The invention provides a device for cleaning a surface which is submerged in a liquid, the device including:

a head having at least one inlet which opposes the surface to be cleaned, means for connecting the head to a suction source to cause liquid to flow through the inlet, turbine means which is driven by the flowing liquid, and propellor means which is driven by the turbine means and which propels the head over the surface to be cleaned.

The device may include steering means for altering the direction in which the head is propelled over the surface to be cleaned.

In a preferred form of the invention the steering means includes at least one rudder and control means for changing the orientation of the rudder relatively to the head. The control means is preferably actuated by the turbine means.

Any suitable alternative way of altering the direction in which the head is propelled over the surface may be used. For example the orientation of the propellor means relatively to the head may be changed so that the thrust which is exerted by the propellor means is applied in a different direction.

It is also possible to change the orientation of the head relatively to the suction source connecting means for example through using suitable gear trains or the like.

Referring to the embodiment which makes use of a rudder the control means may include speed reduction drive means with an input drive member which is driven by the turbine means and an output drive member which is connected to the rudder for changing the orientation of the rudder relatively to the head.

The orientation of the rudder relatively to the head may be changed continuously in that the rudder may be moved all the time. Alternatively means may be included for varying the nature of the control which is exerted over the movement of the rudder.

In one form of the invention the rudder is caused to oscillate by means of a link which is connected to the said output drive member and, through suitably connecting the link to the output drive member, a degree of lost play or lost motion may be incorporated to effect a variation in the manner in which the orientation of the rudder relatively to the head is changed.

The device may include flow deflecting means for urging at least a section of the head towards the surface to be cleaned. The flow deflecting means may for example take the form of a hydroplane or similar shaped flow-deflecting formation. One or more hydroplanes may for example be incorporated on the rudder.

In a preferred form of the invention the rudder is positioned immediately to the rear of the propellor and a respective hydroplane is positioned on each opposing side of the rudder.

The means for connecting the head to a suction source may include a spigot which is rotatable about a longitudinal axis relatively to the head. This spigot is adapted to be connected to a flexible suction hose.

The head may be supported in any appropriate way on the submerged surface. It is possible, for example, to have the head, or an under surface of the head, directly in contact with the surface to be cleaned. It is also possible to have the head surrounded at least partially, but preferably totally, by a peripheral flexible skirt which provides a scraping or sweeping action as the head moves over the submerged surface. In a preferred form of the invention however use is made of rotatable support means fixed to the head which engage with the surface to be cleaned.

The head may include a peripheral region surrounding the inlet and the rotatable support means may space the peripheral region from the surface to be cleaned.

The rotatable support means preferably are of the kind which permit rotation in any direction with a minimal amount of lost motion. The number of rotatable support means may vary according to requirement but in a preferred form of the invention three of the support means are used. Two support means may be located more or less in line with another, when the head is viewed from the side, and a third support means may be located at a forward end of the head. At least portion of the third support means may project beyond an adjacent outer surface of the head.

Guide means may be provided on sides of the head. The guide means may for example comprise one or more rollers which are adapted to engage, in a rolling manner, with portions of the submerged surface which extend transversely, e.g. at right angles, to that portion of the submerged surface with which the head is engaged.

The head may include at least one chamber which contains a quantity of the liquid and which is sealable. The size of the chamber and the amount of liquid included in the chamber may be varied to adjust the buoyancy of the device in the liquid. Other techniques may be alternatively or additionally adopted to adjust the buoyancy of the device. In one form of the invention one or more of the rotatable sealing means include weights of lead or similar material to impart to the device a desired specific gravity.

The invention also extends to a swimming pool cleaner which has a head mounted on wheels, a suction passage through the head, a turbine which is mounted in the suction passage, and a propellor which is driven by the turbine and which propels the head.

The cleaner may include a rudder and a mechanism, actuated by the turbine, for altering the orientation of the rudder relatively to the head.

The head, viewed in plan, may be substantially symmetrical. The propellor means may be aligned centrally relatively to the head or alternatively may be aligned tangentially so as to impart thrust to the head which causes the head to pivot or rotate relatively to the suction connection means.

The head may be made from any suitable material and preferably is made from a plastics material.

The invention also extends to a method of cleaning a surface submerged in a liquid which includes the steps of locating a cleaning head opposing the surface to be cleaned, applying suction to the head and so causing the head to adhere to the surface and liquid to flow through the head, using the flowing liquid to drive propellor means, and using the propellor means to propel the head over the surface to be cleaned.

The flowing liquid is preferably directed through filtration means.

The method may include the step of adjusting the buoyancy of the head by introducing a volume of the liquid into a sealable chamber of the head.

Suction may be applied to the head through a flexible hose which is fixed to the head by means of a connector which is rotatable about a longitudinal axis relatively to the head.

The flowing liquid may be used to actuate steering means and the steering means may be used to alter the direction in which the propellor means propels the head over the surface to be cleaned.

The steering means may include at least one rudder.

Use may be made of at least one hydroplane or similar flow-deflecting device to apply thrust to the head in the direction of the surface on which the head is located.

The head may be supported by means of rotatable support means which maintain an outer wall of the head, which opposes the surface to be cleaned, spaced from the surface.

BRIEF DESCRIPTION OF THE DRAWINGS

The invention is further described by way of example with reference to the accompanying drawings in which.

DESCRIPTION OF PREFERRED EMBODIMENT

Figure 1:
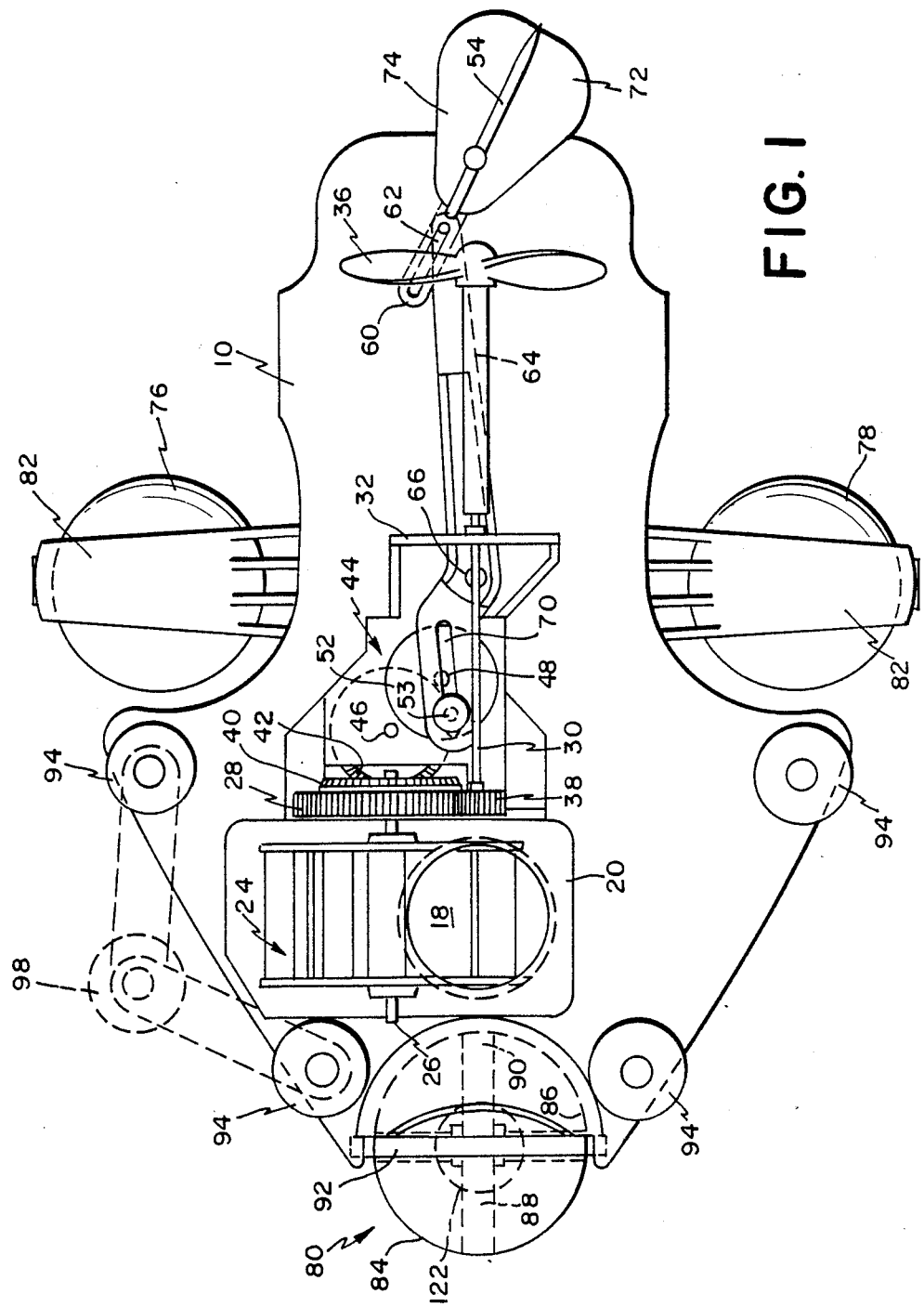
FIG. 1 is a plan view of a lower portion of a pool cleaner according to one form of the invention with an upper cover of the cleaner removed to enhance the clarity of the illustration.
Figure 2:
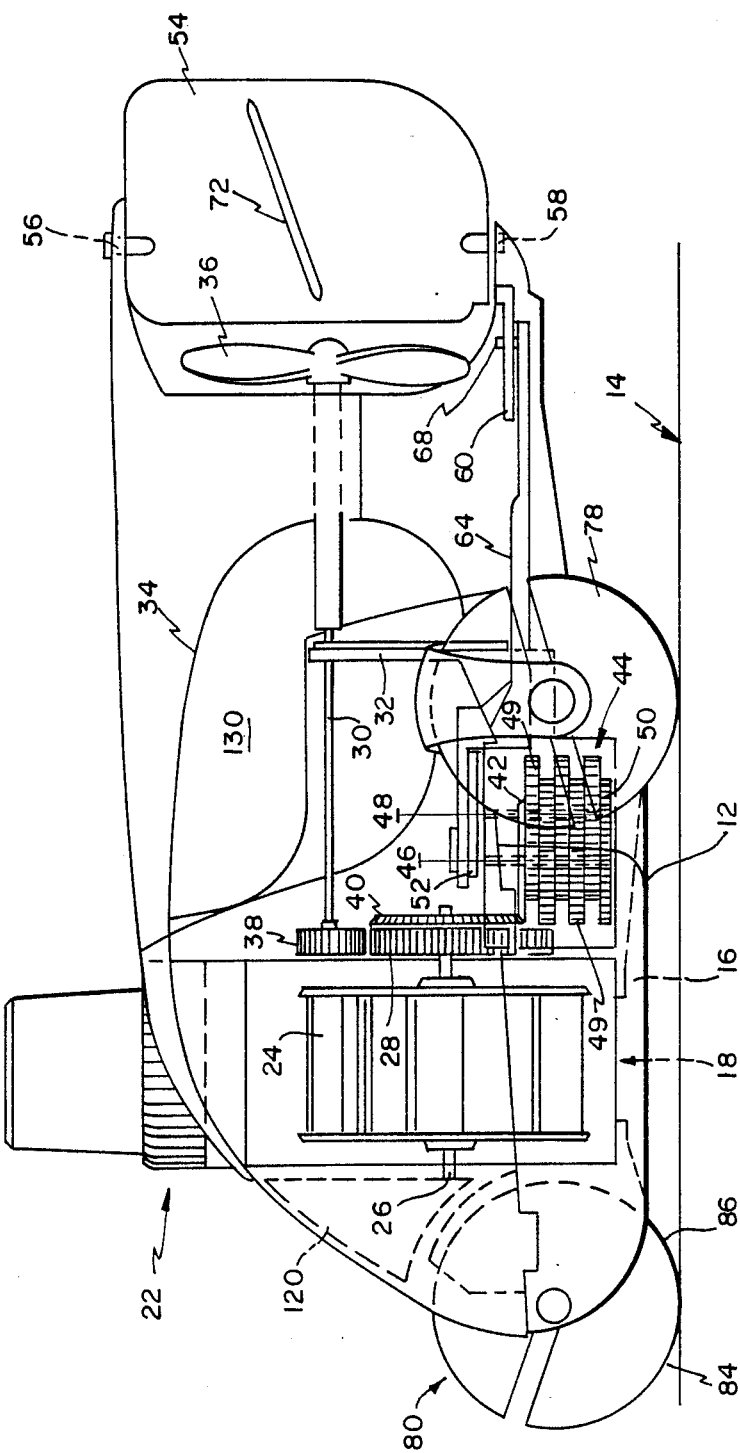
FIG. 2 is a side view of the cleaner of FIG. 1, partly sectioned.

FIGS. 1 and 2 of the accompanying drawings illustrate in plan and from the side respectively a pool cleaner according to the invention. The cleaner includes a housing 10 which is made from a suitable plastics material and which forms a head 12 which opposes a surface 14 of a swimming pool which is to be cleaned. The head includes a recess 16 which leads to an inlet 18 on the underside of a turbine housing 20.

At its upper end the turbine housing is connected to a spigot 22 which is shown in more detail, in cross section, in FIG. 3 and which is described more particularly hereinafter.

The turbine housing 20 contains a turbine or paddle wheel 24 which is mounted on an axle 26. One end of the axle extends through the housing and rotates a drive gear 28.

A shaft 30 which is supported on a pillar 32 extends through an upper cover 34 of the housing. At its outer end the shaft has fixed to it a propeller 36. At its forward end the shaft is connected to a gear 38 which is meshed with the drive gear 28.

A bevel gear 40 is fixed to the axle 26. The bevel gear meshes with a second bevel gear 42 which is the initial gear in a reduction gearbox 44. The gearbox contains two vertical spaced axles 46 and 48 respectively and the bevel gear 42 is uppermost on the axle 46. A plurality of gears 49 are mounted on each of the axles respectively. The gears mesh with one another in a known way and effect a reduction in the rotational drive transferred through the gearbox between successive meshing gears.

The axle 48 is fixed to a lower most gear 50 in the gearbox. This gear is a driven gear and the axle 48 rotates with it.

The axle 48 extends upwardly outside of the gearbox casing and a drive wheel 52 is fixed to it.

An eccentrically located pin 53 extends upwardly on an upper surface of the drive wheel 52. This feature is more clearly visible in FIG. 1.

A rudder 54 is mounted for pivotal movement about in-line upper and lower pivotal points 56 and 58 respectively in opposing upper and lower portions of the housing. The rudder has an integral projecting link 60 with an elongate slot 62. A drive link 64 is mounted for oscillatory movement on an upstanding pin 66. At its rear end the drive link 64 has an upstanding pin 68 which is located loosely within the slot 62. At its forward end the drive link is itself formed with an elongate slot 70 and the pin 53 on the drive wheel 52 is engaged with the slot.

The rudder 54 has, on opposed sides, two hydroplanes 72 and 74 respectively. These shaped deflectors are inclined upwardly towards the rear side of the pool cleaner.

It is to be noted from FIG. 2 that the rudder 54 is located immediately aft of the propeller 36.

As is apparent from FIG. 1 the housing 10 is supported on three wheels 76, 78 and 80 respectively. The wheels 76 and 78 are more or less in line on opposing sides of the housing on a rear side of the turbine while the wheel 80 is at a forward or leading of the housing. The wheels 76 and 78 are each supported between opposing surfaces of the housing and of an overlying support 82 respectively. The wheel 80 is located between two spaced supports at a forward end of the housing.

The construction of the wheel 80 is described hereinafter. The wheels 76 and 78 are however similarly constructed.

The wheel 80 consists of two hemispheres 84 and 86 respectively each of which is mounted for independent rotation about stub axles 88 and 90 respectively, shown in dotted outline. The stub axles extend at right angles, in opposed directions, from a central axle 92 about which both hemispheres are rotatable in unison. The construction of the wheel is such that omni-directional movement of the wheel is possible with very little lost motion when the wheel changes its direction of movement.

The wheel 80 extends outside the general outline of the housing 10 when viewed in plan, and from the side. Thus if the forward end of the pool cleaner should strike an obstacle it is the wheel 80 which strikes the obstacle and not the housing itself.

Guide or deflecting rollers, generally designated 94, are located on sides of the housing between the wheels 76 and 80, and 78 and 80 respectively. These wheels provide rotatable surfaces which project beyond the outer perimeter of the housing 10, when viewed in plan. The wheels on each side may be replaced by a support 96, shown in dotted outline, which supports a single guide or deflector wheel 98. The purpose of the wheels 94, or alternatively of the wheels 98, is described hereinafter.

It is apparent from FIG. 2 that the wheels support the housing with the underside of the housing spaced from the surface 14.

Figure 3:
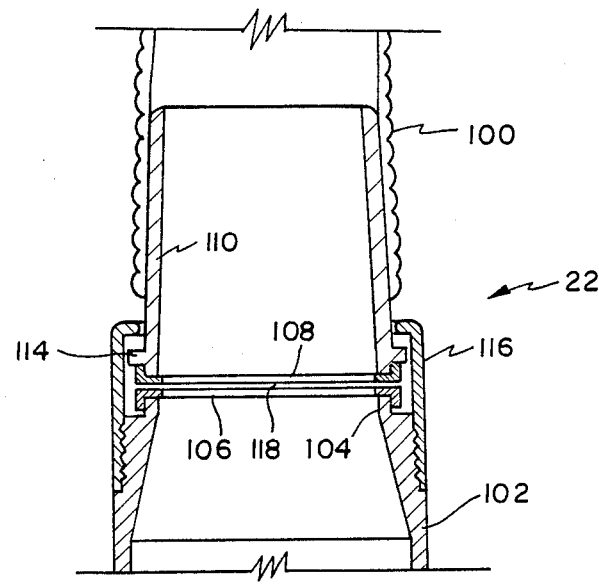
FIG. 3 is a cross sectional side view through a swivel coupling used with the cleaner of the invention.

The construction of the spigot 22 is shown in detail in FIG. 3. The spigot 22 forms a rotatable connector for a flexible hose 100 a remote end of which is connected to a suction source of a filtration unit associated with a swimming pool. The spigot 22 includes an upstanding threaded portion 102 which has a rim 104, a first ring 106 which is rotatably engaged with the rim 104, a second ring 108 which is substantially identical to the ring 106 and which is inverted facing upwardly, an upper connector 110 which has a rim 112 and a shoulder 114 which are engaged with the ring 108, and a union nut 116 which is threadedly engaged with the threaded member 102 and which retains the assembly in the indicated position. The components illustrated are so dimensioned that when the union nut is tightly screwed into position a slight clearance gap 118 exists between opposing surfaces of the rings 106 and 108. This permits the upper connector 110, which is coupled to the hose 100, to be rotatable relatively to the housing 10 of the pool cleaner.

The pool cleaner optionally includes a chamber 120, see FIG. 2, which may be filled with water and sealed. The size of the chamber, its location, and the amount of water placed in the chamber, may all be varied in order to adjust the buoyancy of the pool cleaner to meet particular requirements.

It is also possible to adjust the buoyancy of the pool cleaner through the use of floats, weights and the like. In a preferred approach weights 122 are located inside the hemispherical members of the front wheel 80.

As has been indicated the hose 100, extending from the pool cleaner, is connected to a suction source of a filtration system of the kind commonly encountered in swimming pools. As such systems are conventional their construction has not been described in this specfication.

It has already been pointed out that the buoyancy of the pool cleaner is adjusted to meet requirement. In practice the buoyancy of the pool cleaner is adjusted so that when it is immersed in the water of a swimming pool it sinks to the bottom surface of the pool. However the specific gravity of the pool cleaner is not so much in excess of the specific gravity of water that, when the pool cleaner is in a body of water, it is heavy.

When suction is applied through the hose 100, water is drawn through the inlet 18 at the base of the turbine housing 20. The water entrains debris and foreign material on the surface 14 and together with the entrained material is directed to a filtration unit. In the filtration unit the water is filtered and then returned to the swimming pool. Thus the area of the surface 14 opposing the head 12 is effectively vacuum cleaned.

The wheels space the housing from the surface 14 by an amount which, together with the perimeter of the head, is carefully calculated to ensure that a reasonable suction force exists at the head 12. For example if the area at the perimeter of the head through which water flows is substantially in excess of the area of the inlet 18 then the suction force is reduced. On the other hand if the inlet 18 is substantially larger than the area around the head through which liquid can flow to the inlet then the suction force is increased The liquid flowing through the inlet 18 thus in the first instance causes the opposing area of the surface 14 to be vacuum cleaned. Secondly a suction effect is created which causes the head to adhere to the surface 14. Thirdly the liquid flowing upwardly through the turbine housing 20 impinges on vanes of the turbine 24 causing the turbine to rotate. The turbine rotates freely, and at a high speed, and does not present any significant obstacle to water flowing through the turbine housing nor to foreign material or dirt entrained in the flowing water.

The turbine drives the axle 26 and, via the gears 28 and 38 causes the propellor 36 to rotate. Forward thrust is therefore exerted by the propellor on the housing 10 and the housing is advanced over the surface 14 with the cleaning action continuing.

When the housing moves the wheels 76 to 80 rotate freely and low friction movement is therefore achieved. The wheels are omni-directional and the pool cleaner can therefore move freely in all directions according to the forces acting on the cleaner and according to the contour of the surface 14 over which the cleaner moves.

The rotating axle 26, via the output bevel gear 40 and the reduction gearbox 44, causes the drive wheel 52 to rotate slowly, relatively to the rotational speed of the propellor, about its axis. The eccentric pin 54 thus slowly causes the drive link 64 to oscillate about the pivot point 66. Oscillatory movement is, in a similar way, imparted to the rudder 54 which therefore oscillates, relatively slowly to the speed of the propellor 36, about its axis. The rudder is positioned immediately behind the propellor 36 and consequently exerts a highly effective steering force which causes the pool cleaner continuously to change its direction of movement. The pool cleaner is therefore continuously being subjected to a driving force and a steering action and consequently eventually moves over the entire surface 14 to be cleaned. It is pointed out that other effects also play a part in determining the path of motion of the pool cleaner. Such effects are for example the effect of the hose 100, currents in the body of water in the pool cleaner, the contours of the surface 14 which is to be cleaned, the buoyancy of the pool cleaner, and the like.

The hydroplanes 72 and 74 which are also positioned immediately behind the propellor 36, have the effect that the flowing stream of water produced by the propellor 36 impinges on them and so produces a downward thrust which is applied to the housing 10. The rear of the housing is therefore urged into contact with the surface 14 while, as has been pointed out, the forward wheel 80 is also weighted downwardly by means of the weights 122.

It is possible to achieve a downward thrust, at the rear of the pool cleaner, by making use of additional weights. However this increases the overall mass of the cleaner and this can be disadvantageous when the pool cleaner is to traverse a side wall of a swimming pool, for example moving vertically up a side wall.

When the pool cleaner strikes a side wall then invariably the leading wheel 80 impinges on the side wall before any other portion of the housing. As this wheel is omni-directional in its movement capability and as the hydroplanes 72 and 74 exert a downward thrust on the rear of the housing 10 the pool cleaner is able to negotiate the transition from horizontal to vertical and, still adhering closely to the surface which is to be cleaned, then climb upwardly on the side wall.

The swivel connection 22 of the hose to the pool cleaner permits the housing 10 to rotate relatively to the hose without creating stresses or strain or resistance to movement in the hose.

The pool cleaner can thus climb vertical walls of a swimming pool at least until part of the pool cleaner breaks through the water surface and is exposed to atmosphere. By suitably adjusting the buoyancy of the pool cleaner however it is possible to prevent the cleaner from emerging unduly from the water surface, a factor which could lead to all the water in the housing being drawn out by suction effect and replaced by air. This in turn would cause the pool cleaner to float on the water surface. One way in which the buoyancy can be effectively adjusted is by means of the buoyancy chamber 120. Alternatively, as has been pointed out, use may be made of weights, floats or the like to achieve a similar effect.

The amount of water which flows through the turbine housing is determined inter alia by the size of a pump incorporated in the filtration system. The inlet 18 can be made so that it accommodates a selected washer-like member, or a selected tubular member, of a particular cross sectional area so that an inlet of an appropriate size is defined to meet the particular operating conditions.

The operation of the pool cleaner can also be adjusted by varying the ratio of the gears in the reduction gearbox or by altering the number of gears therein. Other factors which come into play are the shape and size of the turbine, the shape and size of the propellor, the length of the drivelink 64, the position of the pivot point 66, the lengths of the slots 62 and 70, the shape of the rudder, its position relatively to the propellor, and the shapes and positions of the hydroplanes 72 and 74.

Figure 4:
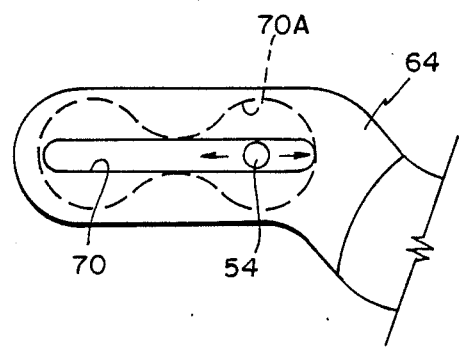
FIG. 4 illustrates a possible variation which may be incorporated in the cleaner.

One particularly convenient way of regulating the movement of the pool cleaner is to replace the drivelink 64 with a drivelink selected from a number of different available drivelinks. FIG. 4 illustrates in solid outline the slot 70 at the forward end of the drivelink 64. The pin 54 fits closely inside the slot and moves to and fro as the drive wheel 52 is rotated. If for example the slot 70 has the shape indicated in dotted outline 70A then, when the pin reaches opposing limiting ends of the slot, a certain amount of lost motion occurs during which oscillatory movement of the drivelink 64 does not take place. The water flowing from the propellor 36 then automatically causes the rudder 54 to be aligned with a central axis through the pool cleaner and the steering action of the rudder is inhibited until such time as the lost motion is taken up.

The upper cover 34 of the housing has openings 130 through which water can flow when the propellor 36 exerts its pumping action. This is necessary for, if the propellor were located in a closed tube, its driving efficiency would be significantly adversely affected.

The guide or deflector rollers 94 on the sides of the housing are only brought into play when a side of the pool cleaner comes into contact with a side of the swimming pool. This occurs for example if the pool cleaner comes into a right-angled corner of a square or rectangular swimming pool. The rollers 94 then impinge on the side wall and provide a low friction guiding effect which enables the pool cleaner to negotiate its way out of the corner. It is to be understood that under certain conditions the pool cleaner may become jammed in a particular location, depending on the geometry of construction of a pool, but the rudder 54 which is continuously oscillated and the propellor 36 which continuously exerts thrust on the pool cleaner, together with the omni-directional moving capabilities of the wheels 76 to 80, eventually create the correct conditions to enable the pool cleaner to free itself from the given location. It is thus only under exceptional conditions that the pool cleaner will become jammed in a position from which it is not able to extricate itself.

It is to be understood that the alternative guide rollers 98 provide a similar function to the rollers 94.

A particular form of construction of the pool cleaner has been described. It is to be understood however that the scope of the specification is not confined to the particular detail shown in the accompanying drawings and described hereinbefore. The essence of the invention resides in the use of a propellor or similar device, which is driven by flowing liquid drawn to a suction source, to provide a propulsive force thereby to propel the pool cleaner over a surface to be cleaned.

I claim:

1. A device for cleaning a surface which is submerged in a liquid, the device including: a head having at least one inlet which opposes the surface to be cleaned, means for connecting the head to a suction source to cause liquid to flow through the inlet, turbine means which is driven by the flowing liquid, propellor means which is driven by the turbine means and which propels the head over the surface to be cleaned, and steering means for altering the direction in which the head is propelled over the surface to be cleaned, the steering means including at least one rudder and control means, actuated by the turbine means, for changing the orientation of the rudder relatively to the head.

2. A device according to claim 1 wherein the control means includes speed reduction drive means with an input drive member which is driven by the turbine means and an output drive member which is connected to the rudder for changing the orientation of the rudder relatively to the head.

3. A device according to claim 2 wherein the orientation of the rudder relatively to the head is continuously changed.

4. A device according to claim 1 which includes flow deflecting means for urging at least a section of the head towards the surface to be cleaned.

5. A device according to claim 1 wherein the means for connecting the head to a suction source includes a spigot which is rotatable about a longitudinal axis relatively to the head.

6. A device according to claim 1 which includes rotatable support means fixed to the head which engage with the surface to be cleaned.

7. A device according to claim 6 wherein the head includes a peripheral region surrounding the inlet, the rotatable support means spacing the peripheral region from the surface to be cleaned.

8. A swimming pool cleaner which has a head mounted on wheels, a suction passage through the head, a turbine which is mounted in the suction passage, a propellor which is driven by the turbine and which propels the head, a rudder, and a mechanism, actuated by the turbine, for altering the orientation of the rudder relatively to the head.

* * * * *